US012777369B2

(12) United States Patent
Bashir et al.

(10) Patent No.: US 12,777,369 B2
(45) Date of Patent: Oct. 27, 2026

(54) DYNAMIC WIRELESS COMMUNICATION NODE SCALING

(71) Applicant: Boost SubscriberCo L.L.C., Englewood, CO (US)

(72) Inventors: Kazi Bashir, Lewisville, TX (US); Mehdi Alasti, Arlington, VA (US); Siddhartha Chenumolu, Ashburn, VA (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 261 days.

(21) Appl. No.: 18/492,354

(22) Filed: Oct. 23, 2023

(65) Prior Publication Data

US 2025/0133441 A1 Apr. 24, 2025

(51) Int. Cl.
*H04W 28/02* (2009.01)
*H04W 28/086* (2023.01)

(52) U.S. Cl.
CPC ... *H04W 28/0289* (2013.01); *H04W 28/0284* (2013.01); *H04W 28/0861* (2023.05)

(58) Field of Classification Search
CPC ......... H04W 28/0289; H04W 28/0284; H04W 28/0861; H04W 28/02; H04W 24/08; H04W 24/02
See application file for complete search history.

(56) References Cited

U.S. PATENT DOCUMENTS

2016/0094479 A1 3/2016 Dwarkha et al.
2019/0370080 A1* 12/2019 Patel .................. H04L 41/0897
2020/0192708 A1 6/2020 Wu et al.
2022/0129460 A1* 4/2022 Clifford ................ G06F 16/285
2022/0385581 A1 12/2022 Delos Reyes et al.
2023/0109690 A1* 4/2023 Mutha .................. G06F 9/5083 718/1
2024/0007377 A1* 1/2024 Kannan ............... H04L 43/0864
2024/0176670 A1* 5/2024 Nanjundappa ........ G06F 9/5044

OTHER PUBLICATIONS

International Search Report and Written Opinion, dated Feb. 12, 2025, for International Patent Application No. PCT/US2024/051420. (28 pages).

* cited by examiner

*Primary Examiner* — Asad M Nawaz
*Assistant Examiner* — Najeeb Ansari
(74) *Attorney, Agent, or Firm* — Seed Intellectual Property Law Group LLP

(57) ABSTRACT

Systems and method for dynamically scaling network function nodes or pods in a wireless network. A number of existing nodes are determined for the wireless network, and an arrival load rate is determined for the existing nodes. A load existence time is also determined for the existing nodes. High and low load thresholds are defined based on the number of existing nodes, the load existence time, and the arrival load rate. A new node is added to the existing nodes in response to determining that a current load on each existing node meets the high load threshold. And at least one existing node is set for removal in response to determining that the current load on the at least one existing node is below the low load threshold. A new received load is then scheduled to be assigned to an existing node having a least average load.

19 Claims, 7 Drawing Sheets

DYNAMIC WIRELESS COMMUNICATION NODE SCALING

BACKGROUND

People are becoming more reliant on the speed, efficiency, and availability of cellular networks. Recently, one advancement in cellular network technology has been to move many of the network functions associated with managing wireless network communications to cloud computing resources, rather than dedicated servers. Accordingly, cloud computing resources are often dedicated for the cellular network. But dedication of such cloud computing resources can result in underutilized or overutilized resources depending on the overall use or load of the network. As a result, resources are wasted when underutilized and the cellular network can become slow or inefficient when overutilized. It is with respect to these and other considerations that the embodiments described herein have been made.

BRIEF SUMMARY

Embodiments are directed towards systems and methods for dynamically scaling network function nodes or pods or workers nodes in a wireless network, such as a cellular network. When communications are sent via the wireless network, one or more network functions or processes is performed on the communications by a node or pod. The number of nodes is increased or decreased to account for fluctuations in the load or traffic on the wireless network. Newly received load is then scheduled to be assigned to an existing node having a least average load.

For each currently existing node, a high load threshold and a low load threshold are defined based on the number of existing nodes, a load existence time, and an arrival load rate. These thresholds may be separately defined for each node or a single threshold may be defined for all nodes or a group of nodes. When the current load of each existing node meets or exceeds its high load threshold, then a new node is added. Additional nodes can continue to be added until a maximum number of nodes is reached. When the current load of a node is below the low load threshold, then that node can be set to be removed when its current load reduces to zero. Additional nodes can continue to be removed until a minimum number of nodes is reached.

Employing embodiments described herein to dynamically scaling the number of nodes using multiple thresholds improves computing resource utilization, optimization, efficiency, and effectiveness.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to the term "user" refer to a person or persons who is or are accessing a website to be displayed on a display device. Accordingly, a "user" more generally refers to a person or persons consuming content on a website. Although embodiments described herein utilize user in describing the details of the various embodiments, embodiments are not so limited. For example, in some implementations, the term "user" may be replaced with the term "viewer" throughout the embodiments described herein.

Figure 1:
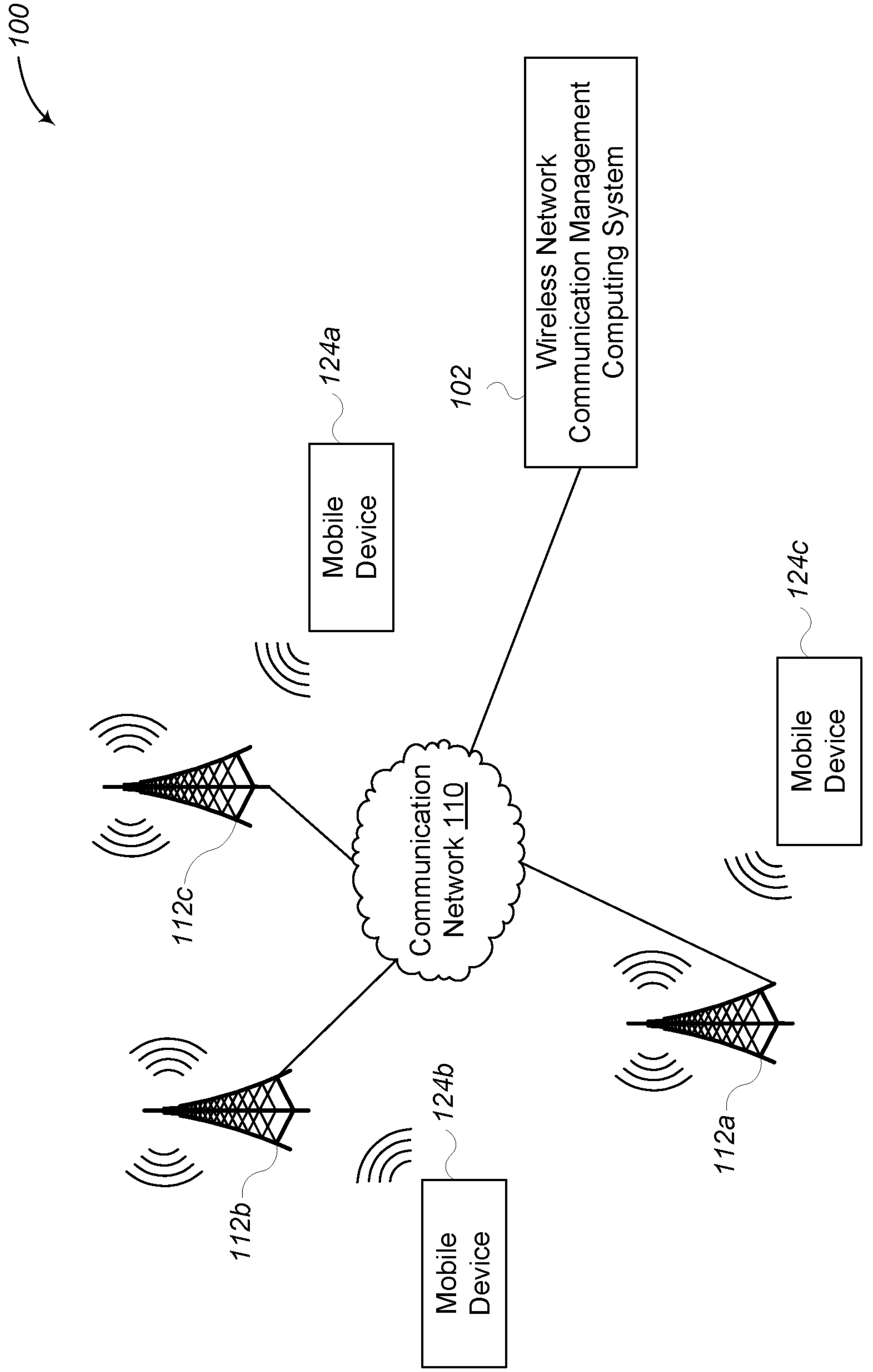
FIG. 1 illustrates a context diagram of an environment for dynamically scaling nodes in a wireless communication network in accordance with embodiments described herein.

FIG. 1 illustrates a context diagram of an environment 100 for dynamically scaling nodes in a wireless communication network in accordance with embodiments described herein. Environment 100 includes a plurality of cells 112*a*-112*c*, a plurality of mobile devices 124*a*-124*c*, a wireless network communication management computing system 102, and a communication network 110.

The cells 112*a*-112*c* are cellular towers that together provide the hardware infrastructure of a cellular communications network, e.g., a 5G cellular communications network. The cells 112*a*-112*c* may include or be in communication with base stations, radio back haul equipment, antennas, or other devices, which are not illustrated for ease of discussion. In various embodiments, the cells 112*a*-112*c* may communicate with each other via communication network 110. Communication network 110 includes one or more wired or wireless networks, which may include a series of smaller or private connected networks that carry information between the cells 112*a*-112*c*.

The mobile devices 124*a*-124*c* are computing devices that receive and transmit cellular communications with the cells 112*a*-112*c*. Mobile devices 124*a*-124*c* may be referred to as user devices, mobile computing devices, user mobile devices, user equipment, or other similar terminology. Examples of mobile devices 124*a*-124*c* may include, but are not limited to, mobile phones, smartphones, tablets, cellular-enabled laptop computers, or other computing devices that can communication with a cellular network.

The wireless network communication management computing system 102 is a server, computing device, cloud computing environment, or some other computing system configured to processes cellular communications transmitted from or to be received by mobile devices 124*a*-124*c*. The wireless network communication management computing system 102 is configured to manage a plurality of "nodes" that process the communications. The number of nodes being managed or used by the wireless network communication management computing system 102 is dynamically changed to scale up or scale down based on the load or traffic on the wireless network. In various embodiments, these nodes, also referred to as PODs or pods, may be logical units that perform or execute one or more tasks or network functions associated with the management of communications on the wireless network.

The wireless network communication management computing system 102 is configured to utilize multiple parameters to scale up or scale down the number of nodes being utilized. These parameters include a minimum number of possible nodes, a maximum number of possible nodes, the arrival load rate of the system, the average time a load exists on one or more nodes, and the current number of existing nodes. The arrival load rate of the system, the average time a load exists on one or more nodes, and the current number of existing nodes are used to set a high load threshold and a low load threshold for each node. The high load threshold is used to determine when a node is "full" and a new node is added, and the low load threshold is used to determine with a node is under-utilized and set to be removed. As nodes are added or removed the minimum number of possible nodes is maintained while not exceeding the maximum number of possible nodes. Further embodiments are described in more detail below.

Figure 2:
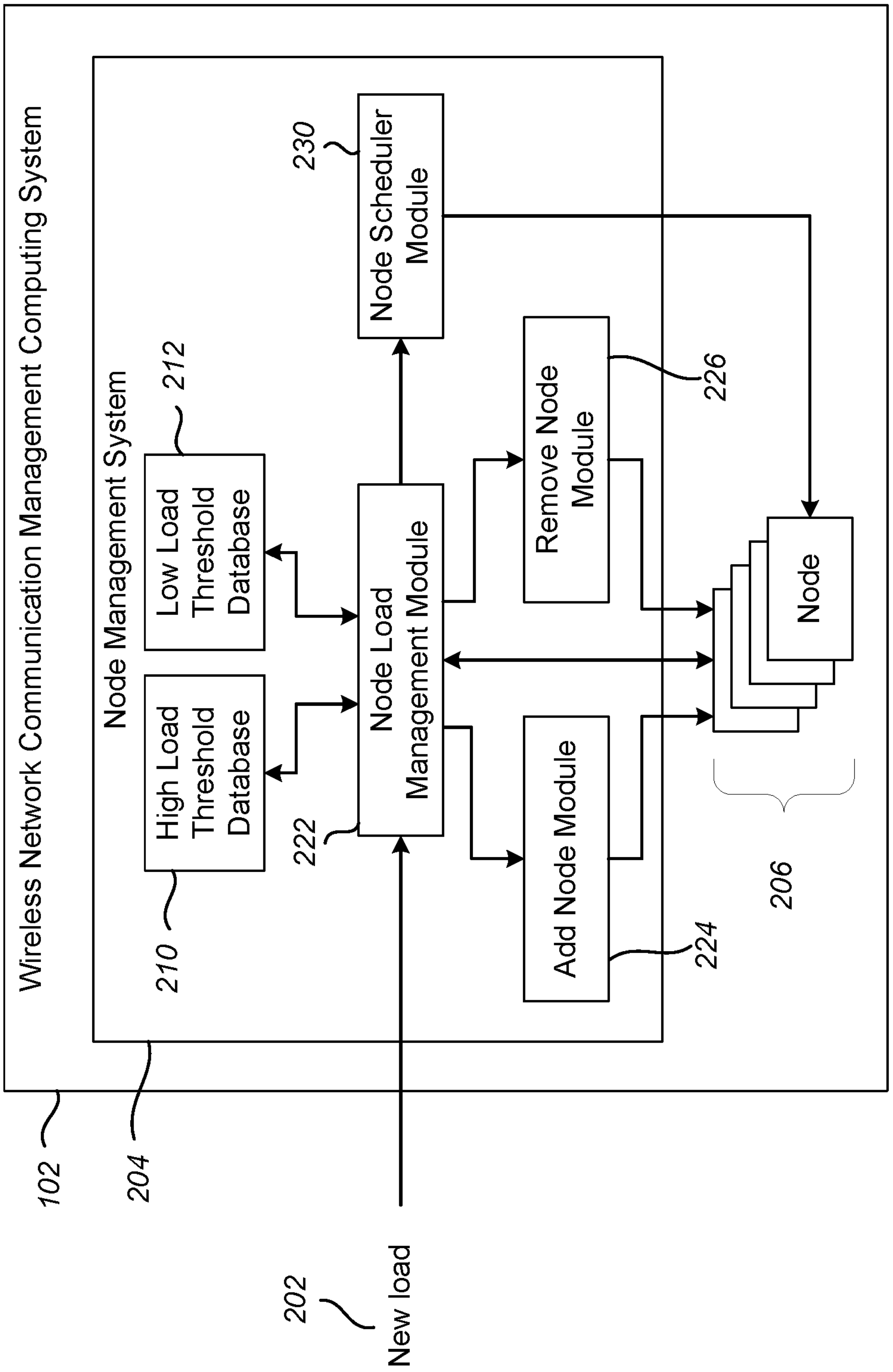
FIG. 2 is a context diagram of a non-limiting embodiment of a system that provides functionality to dynamically scale nodes in a wireless communication network in accordance with embodiments described herein.

FIG. 2 is a context diagram of a non-limiting embodiment of the wireless network communication management computing system 102 that provides functionality to dynamically scale nodes in a wireless communication network in accordance with embodiments described herein. System 200 includes a node management system 204 and nodes 206. In some embodiments, the nodes 206 may be maintained or executed by another computing system (not illustrated).

The node management system 204 may include a node load management module 222, an add node module 224, a remove node module 226, a node scheduler module 230, a high load threshold database 210, and a low load threshold database 212.

The node load management module 222 is configured to scale up or scale down the number of nodes 206. The node load management module 222 receives new load 202, such as from a mobile device 124 in FIG. 1. The node load management module 222 determines or defines a high load threshold and a low load threshold for nodes 206. The node load management module 222 compares the current loads of the nodes 206 to the appropriate thresholds. If the node load management module 222 determines that all exiting nodes 206 meet the high load threshold, then the node load management module 222 instructs the add node module 224 to add a new node. But when the node load management module 222 determines that at least one node 206 fails to meet the low load threshold, then the load management module 222 instructs the remove node module 224 to remove that node. The node load management module 222 then coordinates the scheduling of the new load 202 on a node 206 via node schedule module 230.

In various embodiments, the node load management module 222 determines high load thresholds and low load thresholds for each node 206. The node load management module 222 can store those thresholds in the high load threshold database 210 and the low load threshold database 212, respectively, for future use. In some embodiments, the node load management module 222 determines new thresholds each time a new load 202 is received. In other embodiments, the node load management module 222 determines new thresholds in response to some other action, such as a change in the number of nodes 206, a change in the rate at which new loads 202 are arriving at the node load management module 222, the amount of time loads exist on a node, periodically, at preset times, or at other times.

The add node module 224 is configured to manage computing resources to add nodes to node 206 in response to the node load management module 222 determining that one or more nodes need to be added. In some embodiments, the add node module 224 allocates the appropriate computing resources for the newly added node. The remove node module 226 is configured to monitor nodes that have been identified or labeled for removal and to remove those nodes that have no current load. When a node's load has reduced to be lower than the low load threshold, then that node is labeled for removal. Generally, that node is not removed immediately; rather, no new load will be assigned to that node. Once that node is empty (i.e., its load becomes zero), that node is removed. In some embodiments, the remove node module 224 releases computing resources from the node when it is removed. And the node scheduler module 230 is configured to schedule and assign new load 202 to a node 206 as directed by the node load management module 222. In some embodiments, the node scheduler module 230 includes a load balancer to balance the loads of the nodes 206.

Although the node load management module 222, the add node module 224, the remove node module 226, and the node scheduler module 230 are illustrated as separate modules, embodiments are not so limited. Rather, one module or a plurality of modules may be employed to perform the functionality of the node load management module 222, the add node module 224, the remove node module 226, and the node scheduler module 230.

The operation of certain aspects will now be described with respect to FIGS. 3 and 4A-4C. Processes 300 and 400 described in conjunction with FIGS. 3 and 4A-4C, respectively, may be implemented individually or collectively by one or more processors or executed individually or collectively via circuitry on one or more computing devices, such as wireless network communication management computing system 102 in FIG. 1.

Figure 3:
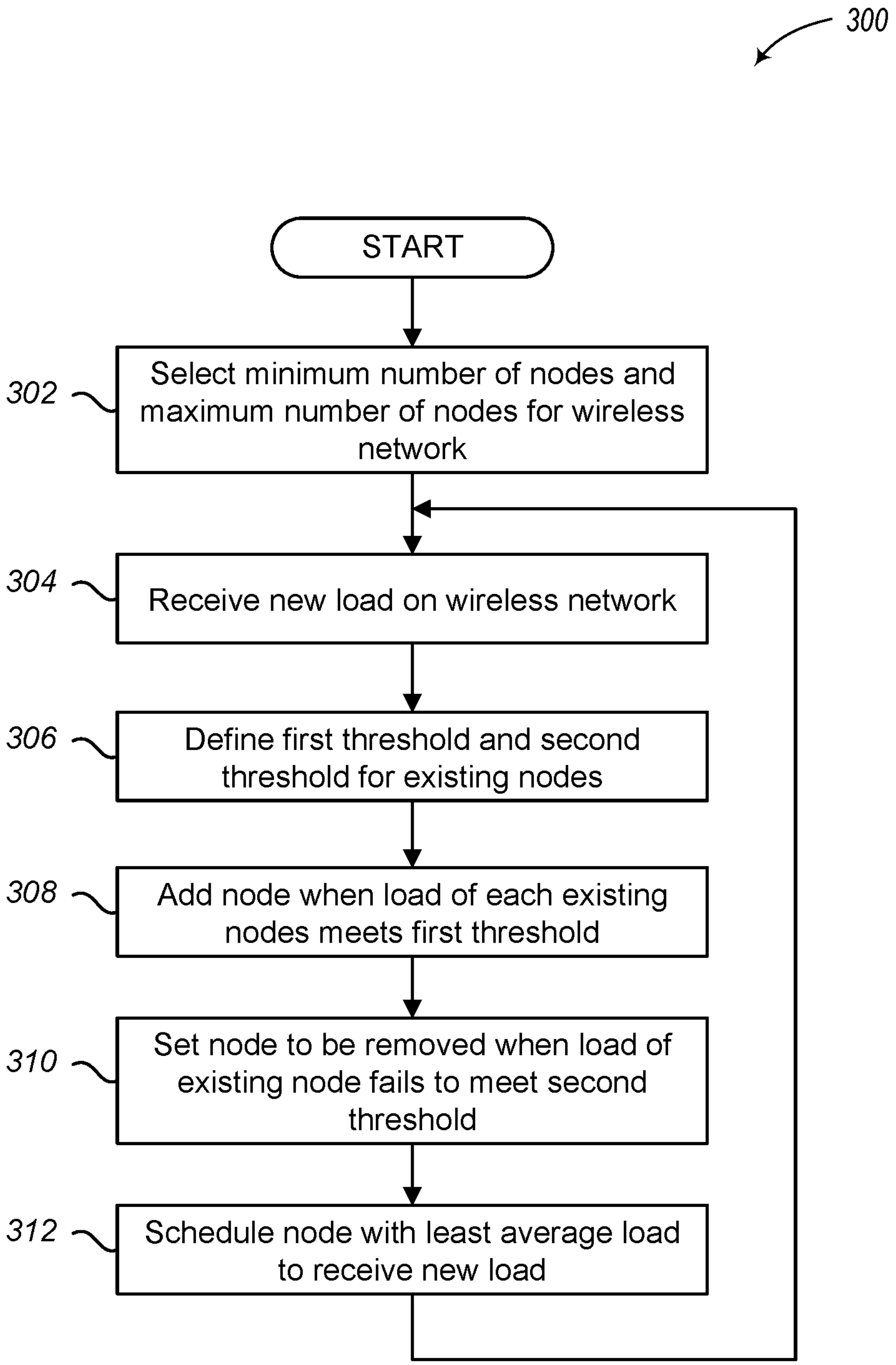
FIG. 3 illustrates a logical flow diagram showing one embodiment of an overview process for dynamically scaling nodes in a wireless communication network in accordance with embodiments described herein.

FIG. 3 illustrates a logical flow diagram showing one embodiment of an overview process 300 for dynamically scaling nodes in a wireless communication network in accordance with embodiments described herein.

Process 300 begins, after a start block, at block 302, where a minimum number of nodes and a maximum number of nodes are selected for a wireless network. As described herein, each node is a logic unit to perform or execute a process or network function on communications for the wireless network. The processing, network functions, or communications being managed by a node is referred to as the load on the node.

In various embodiments, the minimum number of nodes and the maximum number of nodes may be selected or set by an administrator. In some embodiments, the minimum number of nodes, or the maximum number of nodes, or both, may be selected based on an amount of computing resources available. In other embodiments, the minimum number of nodes, or the maximum number of nodes, or both, may be dynamically selected based on a number of mobile devices currently connected to and using the wireless network. In yet other embodiments, the minimum number of nodes, or the maximum number of nodes, or both, may be dynamically selected or based on a possible number of mobile devices that could connect to and use the wireless network. The minimum number of nodes, or the maximum number of nodes, or both, may also be selected based on the geographic area or service area of the wireless network being supported by the nodes.

Process 300 proceeds after block 302 to block 304, where a new load on the wireless network is received. In various embodiments, the new load is a wireless communication being transmitted via or managed by the wireless network.

Process 300 continues after block 304 at block 306, where a first threshold and a second threshold are defined for the existing nodes. In various embodiments, the first threshold is a high load threshold and the second threshold is a low load threshold. The first threshold may be defined as a utilization (or load) value or percentage of a given node that is lower than complete utilization of the given node. For example, the first threshold may be 85% of 100% utilization of a node. Similarly, the second threshold may be defined as a utilization (or load) value or percentage of a given node that is higher than zero utilization of the given node. For example, the second threshold may be 15% utilization of a node.

In some embodiment, the first threshold or the second threshold, or both, may be separately defined for each corresponding node. Accordingly, each node may have its own corresponding first threshold and corresponding second threshold. In other embodiments, a single first threshold or a single second threshold, or both may be defined for all nodes. In such an embodiment, all nodes have a same first threshold and a same second threshold. In yet other embodiments, a single first threshold or a single second threshold, or both may be defined for a group or sub-group of nodes, but not all nodes. In this way, different groups of nodes (for example different groups of nodes performing different network functions) may have separate thresholds, but the nodes in a particular group have a single threshold.

In various embodiments, the first threshold or the second threshold, or both, may be dynamically changed over time based on a current number of existing nodes, an average time a load exists on a node, an average arrival load rate, or some combination thereof. For example, the second threshold may be set higher when the current number of existing nodes is higher, but lower when the current number of existing nodes is lower. As another example, the first threshold may be set higher when the average arrival load rate is higher, but lower when the average arrival load rate is lower. As yet another example, when the load (e.g., the load of a single node or the aggregate load among a plurality of nodes) is higher compared to lower loads, the first threshold (i.e., the high threshold) may be lower and the second threshold (i.e., the low threshold) may be higher. Similarly, as the load (e.g., the load of a single node or the aggregate load among a plurality of nodes) increases over time, the first threshold (i.e., the high threshold) may be decreased over time and the second threshold (i.e., the low threshold) may be increased over time. Changes in the current number of existing nodes, the average time a load exists on a node, or the average arrival load rate, or some combination of may result in changes in the first threshold or the second threshold, or both.

Process 300 proceeds next after block 306 at block 308, where a node is added when the load of each existing node meets or exceeds the first threshold. In various embodiments, the current load of each existing node is compared to the first threshold. Because new loads are scheduled for the node with the lowest or least average load, each node should approach the first threshold at or near the same time. And when the load of each existing node meets the first threshold, a new node is added. In various embodiments, adding a new node may include spinning up a virtual machine, defining or deploying a Kubernetes pod, establishing a computing container, or otherwise allocating computing resources to perform the functionality of the new node. Moreover, additional nodes may be continuously added until the maximum number of nodes is reached, at which point no new nodes are added.

Process 300 continues next after block 308 at 310, where a node is set to be removed when the load of an existing node fails to meet or is below the second threshold. In various embodiments, the current load of each existing node is compared to the second threshold. And when the load of one or more existing node fails to meet or is below the second threshold, then each of those nodes is set to be removed once those nodes have no current load (i.e., the node has completed processing the load it had when set to be removed). As discussed in more detail herein, when a node is set to be removed, the load scheduler does not assign any new load to it, so long as the number of nodes not set to be removed is above the minimum number of nodes. In this way, the node is removed once it is empty and has no current load. Moreover, nodes may be continuously removed until the minimum number of nodes is reached, at which point no additional nodes are removed.

Although embodiments described herein primary discuss a first and second threshold (or high threshold and a low threshold) for each node, embodiments are not so limited. In some embodiments, additional thresholds may also be defined and utilized. For example, a third threshold can be defined for each separate node or for all nodes. This third threshold can be lower than the high threshold. In various embodiments, the third threshold may be used when it takes a threshold or selected amount of time to create a new node. In that case, when the current load for least one node reaches or hits the third threshold, the system starts creating one or more new nodes, which may be referred to as standby nodes, before the nodes reach the high threshold. In this way, by the time the load of a node (whether the node that initially reached the third threshold or some other node) reaches the first threshold (i.e., the high threshold), the new node is ready. In some embodiments, the new node (i.e., the standby node) is not scheduled to receive new load until at least the load of one of the nodes hits the first threshold (i.e., the high threshold). Accordingly, this third threshold provides time to create the new nodes before the current load on each existing node get too high. In yet other embodiments, additional thresholds can be employed to monitor the existing nodes for multiple conditions to determine if a new node should be added, an existing node should be removed, or existing nodes should be tracked for load changes.

Process 300 proceeds after block 310 to block 312, where the node with the least average load is scheduled to receive the new load. In various embodiments, the new load is assigned to the node that is schedule to receive the new load in response to receiving the new load. In some embodiments, a load balancer may be used to schedule or assign the new load among the existing nodes. This load balancer ensures that any new load is assigned to the node with the lowest load (so long as it is not set to be removed), while also ensuring, in the steady state, that the current load of the nodes are almost equal (i.e., the loads are balanced among existing nodes).

After block 312, process 300 loops to block 304 to receive another new load on the wireless network.

Figure 4A:
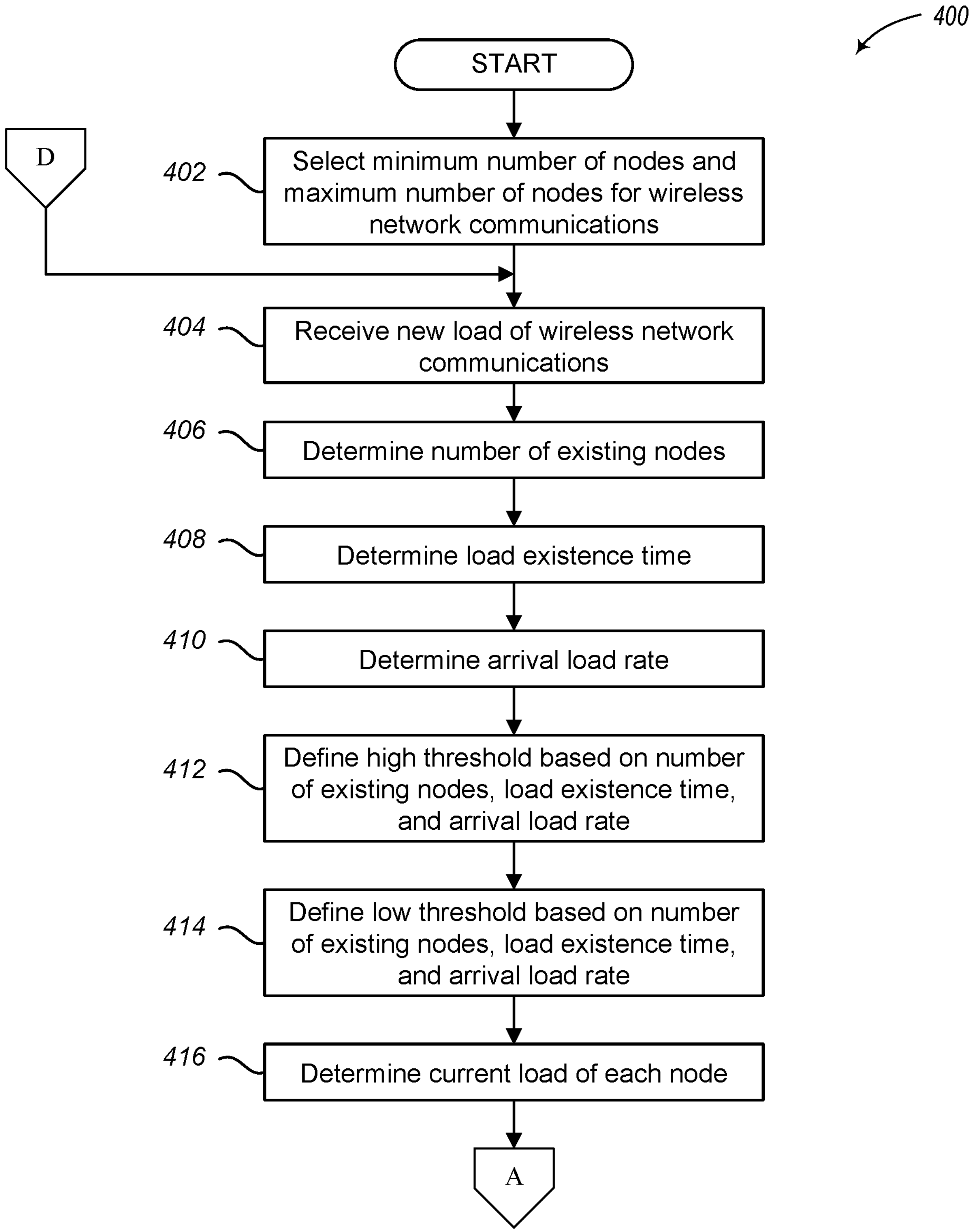
FIGS. 4A-4C illustrate logical flow diagrams showing one embodiment of a detailed process for dynamically scaling nodes in a wireless communication network in accordance with embodiments described herein.
Figure 4B:
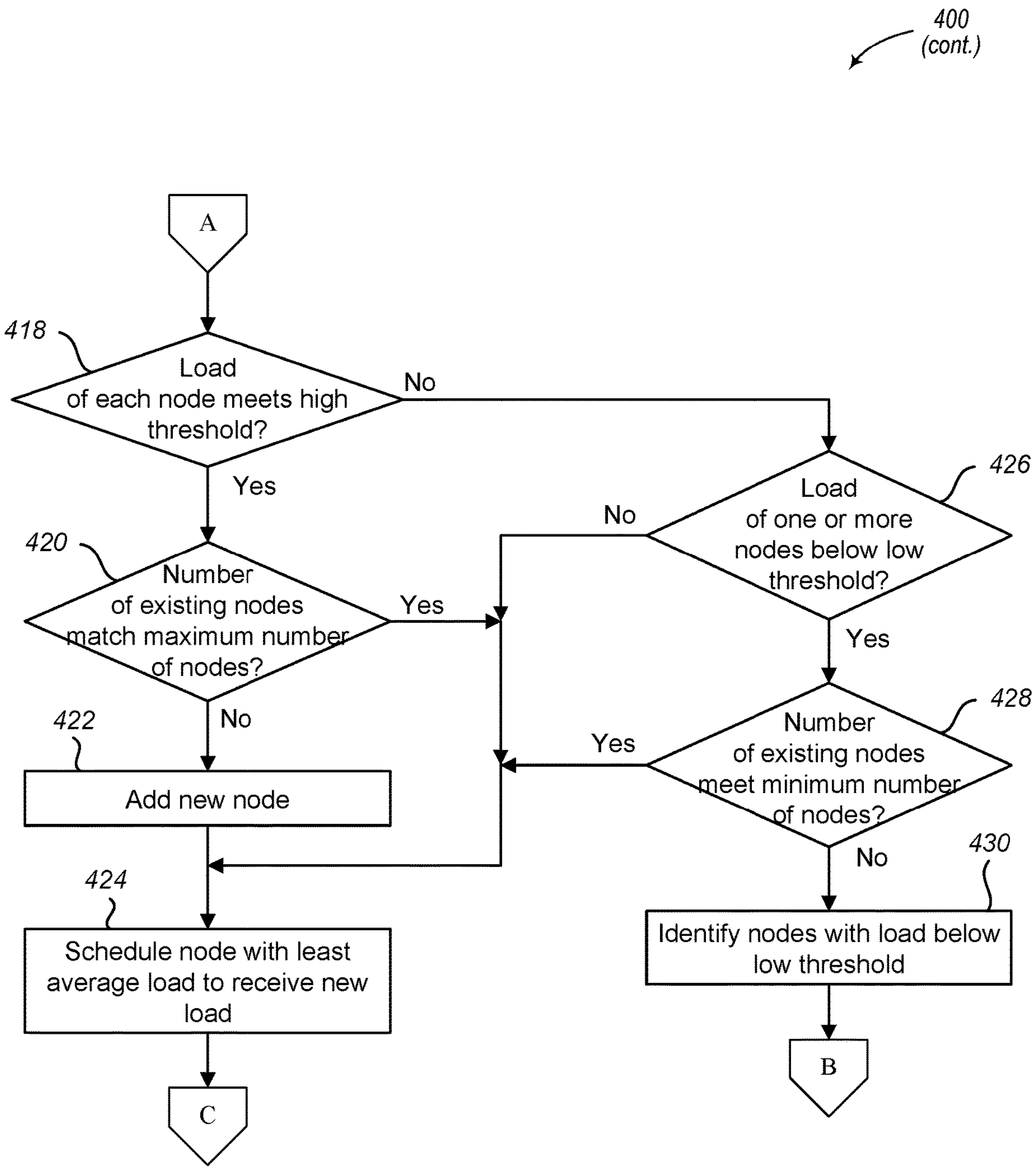
Figure 4C:
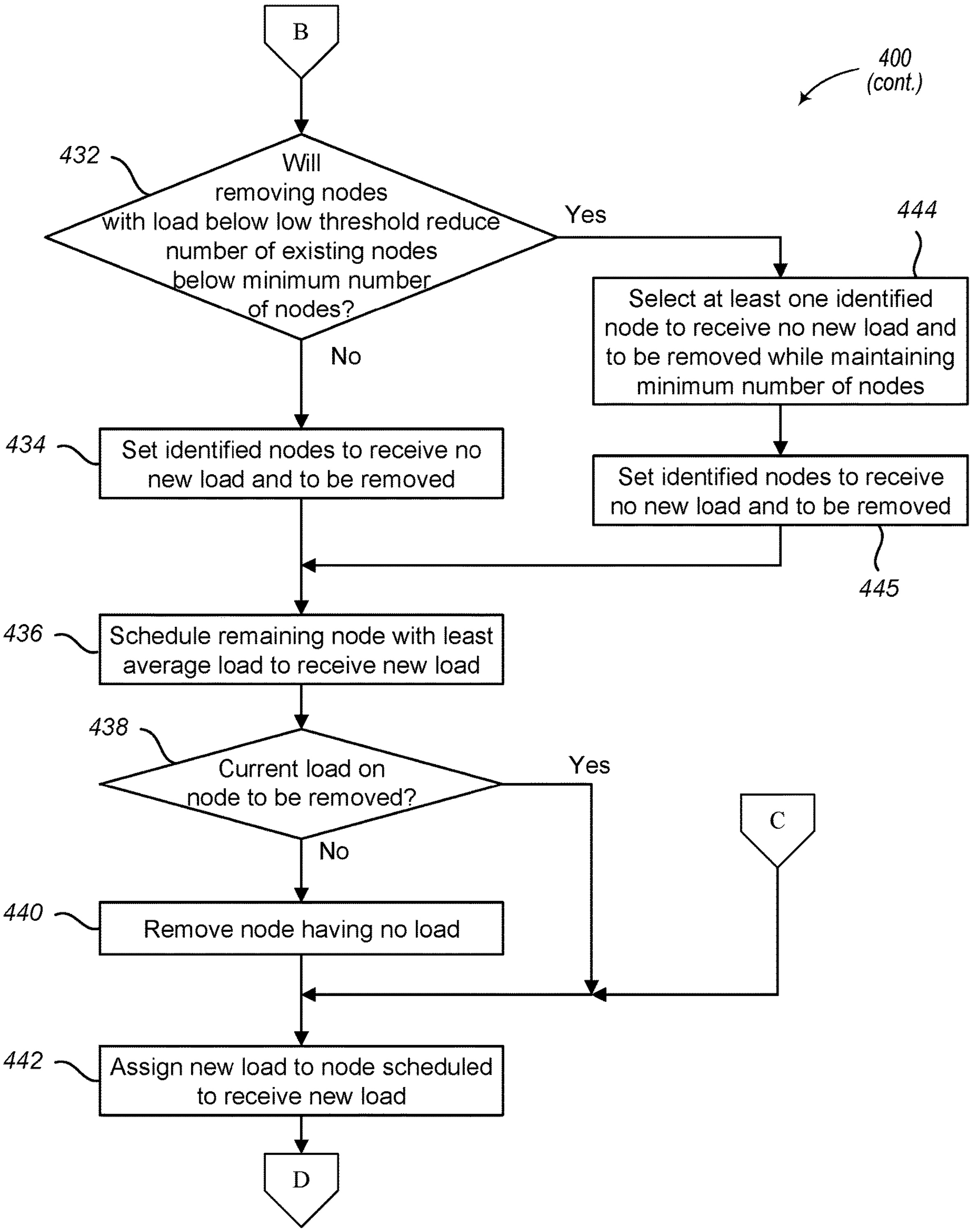

FIGS. 4A-4C illustrate logical flow diagrams showing one embodiment of a detailed process 400 for dynamically scaling nodes in a wireless communication network in accordance with embodiments described herein. In various embodiments, process 400 is a more detailed version of process 300 in FIG. 3.

Process 400 begins, after a start block in FIG. 4A, at block 402, where a minimum number of nodes and a maximum number of nodes are selected for a wireless network. In various embodiments, block 402 may employ embodiments of block 302 in FIG. 3 to select the minimum and maximum number of nodes.

Process 400 proceeds after block 402 to block 404, where a new load is received on the wireless network. In various embodiments, block 404 may employ embodiments of block 304 in FIG. 3 to receive a new load of the wireless network.

Process 400 continues after block 404 to block 406, where a number of existing nodes is determined.

Process 400 proceeds next after block 406 to block 408, where a load existence time is determined for each existing node. In various embodiments, the load existence time for a particular node is the average time a specific load exists on that particular node. For example, the load existence time may be calculated from the time the load is assigned to the particular node to the time when the particular node completes the task or network functions of that load. In some embodiments, the load existence time may be calculated as an average across all existing nodes.

Process 400 continues next after block 408 at block 410, where an arrival load rate is determined for the wireless network. In various embodiments, the arrival load rate is the speed or rate (e.g., amount of data per time unit) at which additional load, or data, is received by the wireless network for processing by a node.

Process 400 proceeds after block 410 to block 412, where a high threshold is defined for each existing node. In some embodiments, this high threshold may also be referred to as a high load threshold, a first threshold, a first load threshold, or some other similar terminology. In various embodiments, the high threshold for a node may be defined based on the current number of existing nodes determined at block 406, the load existence time determined at block 408, or the arrival load rate determined at block 410, or some combination thereof. In some embodiments, block 412 may employ embodiments of block 306 in FIG. 3 to define the high, or first, threshold.

In some embodiments, a separate high threshold is defined for each separate existing node. In such an embodiment, each existing node has a corresponding high threshold defined based on the current number of existing nodes, the load existence time for that corresponding node, or the arrival load rate, or some combination thereof. In other embodiments, a single high threshold is defined for all currently existing nodes.

Process 400 continues after block 412 at block 414, where a low threshold is defined. In some embodiments, this low threshold may also be referred to as a low load threshold, a second threshold, a second load threshold, or some other similar terminology. In various embodiments, the low threshold for a node may be defined based on the current number of existing nodes determined at block 406, the load existence time determined at block 408, or the arrival load rate determined at block 410, or some combination thereof. In various embodiments, block 414 may employ embodiments of block 306 in FIG. 3 to define the low, or second, threshold.

In some embodiments, a separate low threshold is defined for each separate existing node. In such an embodiment, each existing node has a corresponding low threshold defined based on the current number of existing nodes, the load existence time for that corresponding node, or the arrival load rate, or some combination thereof. In other embodiments, a single low threshold is defined for all currently existing nodes.

In some embodiments, a single high threshold may be defined for all existing nodes, but separate low thresholds for each corresponding node. In other embodiments, a single low threshold may be defined for all existing nodes, but separate high thresholds for each corresponding node. In yet other embodiments, a single high threshold and a single low threshold may be defined for all existing nodes. And in other embodiments, separate high thresholds and separate low thresholds may be defined for each corresponding node.

Process 400 proceeds next after block 414 to block 416, where a current load of each existing node is determined. In some embodiments, each node is pinged or queried for its current load. In other embodiments, the wireless network communication management computing system may track the amount of load on each node.

After block 416, process 400 continues at decision block 418 in FIG. 4B.

At decision block 418, a determination is made whether the load of each node exceeds the high threshold. In various embodiments, the current load of each node is compared to the high threshold for that node. If each node meets (or exceeds) the high threshold, then process 400 flows to decision block 420; otherwise, process 400 flows to decision block 426.

At decision block 420, a determination is made whether the existing number of nodes matches the maximum number of nodes. This determination may be made by comparing the current number of nodes to the maximum number of nodes selected at block 402 in FIG. 4A. If the existing number of nodes matches the maximum number of nodes, then process 400 flows from decision block 420 to block 424; otherwise, process 422 flows from decision block 420 to block 422.

At block 422, a new node is added. In various embodiments, adding a new node may include spinning up a virtual machine, defining or deploying a Kubernetes pod, establishing a computing container, or otherwise allocating computing resources to perform the functionality of the new node, similar to what is described in block 308 in FIG. 3.

Process 400 proceeds after block 422 to block 424, where the node with the least average load is scheduled to receive the new load. In various embodiments, a queue or scheduler may be utilized to determine which existing node has the least average load over a selected period of time. Once identified, that node having the least average load is tagged or labeled as being the next node to be assigned the new load. In some embodiments, a load balancer may also be used to help balance the load among the existing nodes.

After block 424, process 400 proceeds to block 442 in FIG. 4C.

If, at decision block 418 in FIG. 4B, the load of each node does not meet (or exceed) the high threshold, then process 400 proceeds from decision block 418 to decision block 426.

At decision block 426, a determination is made whether the load of one or more nodes is below the low threshold. In various embodiments, the current load of each node is compared to the low threshold for that node. If the load of one or more nodes is below (or in some embodiments meets) the low threshold, then process 400 flows to decision block 428; otherwise, process 400 flows to block 424.

At decision block 428, a determination is made whether the existing number of nodes meets the minimum number of nodes. This determination may be made by comparing the current number of nodes to the minimum number of nodes selected at block 402 in FIG. 4A. If the existing number of nodes meets the minimum number of nodes, then process 400 flows to block 424; otherwise, process 400 flows to block 430.

At block 430, each node that has a load below the low threshold is identified.

After block 430, process 400 proceeds to decision block 432 in FIG. 4C.

At decision block 432, a determination is made whether removing all nodes identified with a load below the low threshold will reduce the number of existing nodes to be below the minimum number of nodes. This determination may be made by subtracting the number of nodes identified at block 432 from the current number of nodes, and comparing that result to the minimum number of nodes selected at block 402 in FIG. 4A. If the result is less than the minimum number of nodes, then removing all nodes identified with a load below the low threshold will reduce the number of existing nodes to be below the minimum number of nodes. If removing all nodes with a load below the low threshold will reduce the number of existing nodes to be below the minimum number of nodes, then process 400 flows to block 444; otherwise, process 400 flows to block 434.

At block 444, at least one of the identified nodes having a load below the low threshold is selected to receive no new load and to be removed. In various embodiments, these nodes are selected such that the minimum number of nodes is maintained after such nodes are removed.

Process 400 proceeds after block 444 at block 445, where the at least one node selected at block 444 is set to receive no new load and to be removed. In various embodiments, the at least one selected node is labeled or identified for removed. By labeling a particular node for removal, no new load is scheduled or assigned to that particular node.

After block 445, process 400 proceeds to block 436.

If, at decision block 432, removing all nodes with a load below the low threshold will not reduce the number of existing nodes to be below the minimum number of nodes, then process 400 flows from decision block 432 to block 434.

At block 434, each identified node having a load below the low threshold is set to receive no new load and to be removed. In various embodiments, block 434 may employ embodiments of block 445 to set a node for removal, such that the node is removed after it is empty and has no current load. After block 434, process 400 proceeds to block 436.

At block 436, the remaining node with the least average load is scheduled to receive the new load. The remaining node is an existing node that is not labeled for removal. In various embodiments, block 436 may employ embodiments of block 424 in FIG. 4B to schedule a node to receive the new load.

Process 400 proceeds after block 436 to decision block 438, where a determination is made whether there is a current load on a node set to be removed. If a node set to be removed still has a current load that it is processing, then process 400 flows to block 442; otherwise, process 400 flows to block 440 to remove the node that has no load.

After block 440, process 400 proceeds to block 442.

At block 442, the new load that has been received is assigned to the node that is scheduled to receive the new load. As described herein, a load balancer may be used to schedule or assign new loads to the existing nodes, which helps balance the current loads on the existing nodes.

After block 442, process 400 loops to block 404 in FIG. 4A to receive a new load.

Although processes 300 and 400 are described as receiving a new load on the wireless network before scaling the nodes, embodiments are not so limited. In other embodiments, processes 300 and 400 may be performed at selected times, periodically, at set intervals, in response to changes in load on the network, or in response to other characteristics of the network. In this way, the nodes may be dynamically scaled before a new load is received such that the node with the least average load is scheduled for a next new load that is received.

Figure 5:
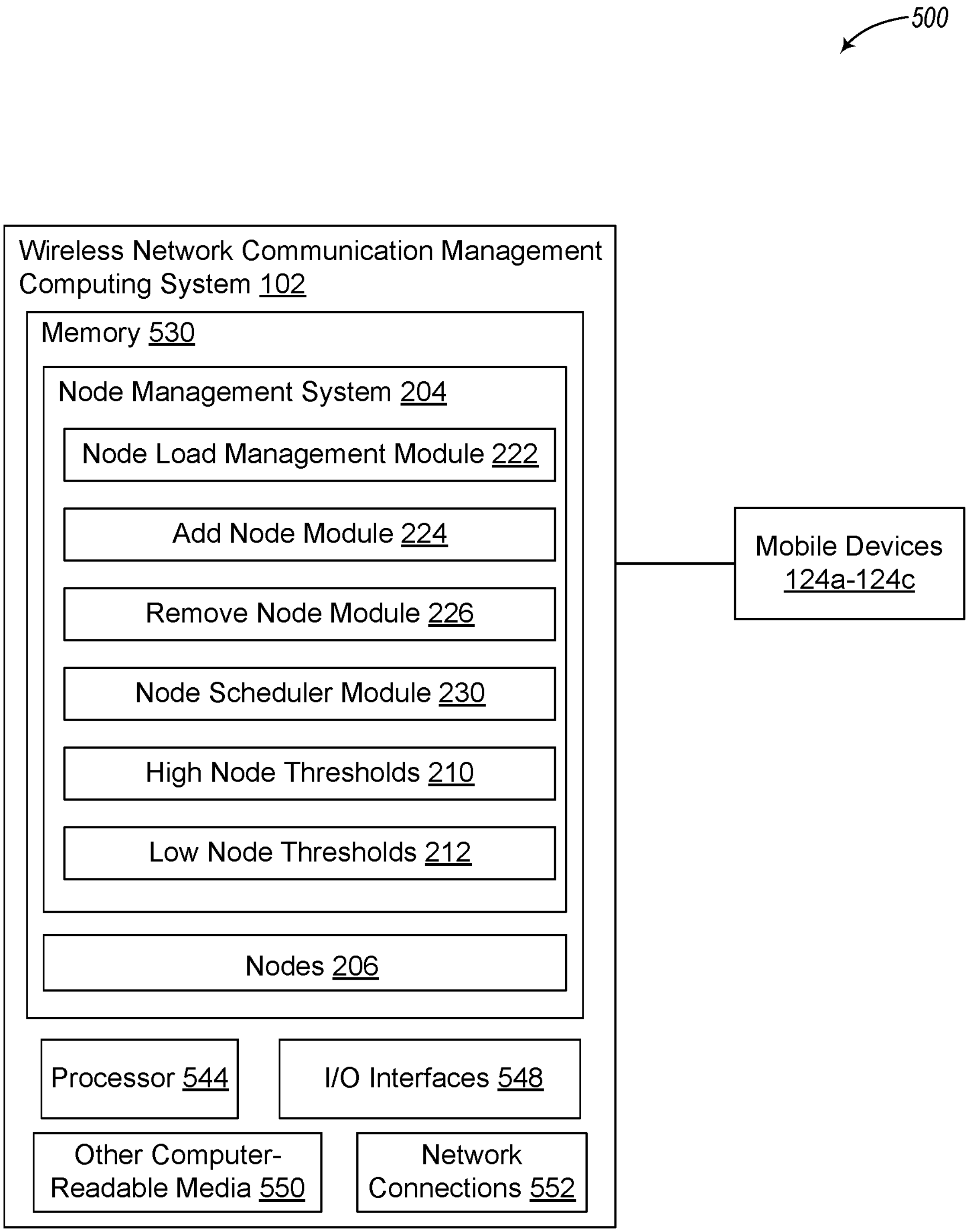
FIG. 5 shows a system diagram that describes one implementation of computing systems for implementing embodiments described herein.

FIG. 5 shows a system diagram that describes one implementation of computing systems for implementing embodiments described herein. System 500 includes a wireless network communication management computing system 102 and mobile devices 124*a*-124*c*.

The wireless network communication management computing system 102 is a computing system or environment that dynamically scales a plurality of nodes to perform network functions associated with communications of a wireless network, as described herein. One or more special-purpose computing systems may be used to implement the wireless network communication management computing system 102. Accordingly, various embodiments described herein may be implemented in software, hardware, firmware, or in some combination thereof. The wireless network communication management computing system 102 includes memory 530, processor 544, I/O interfaces 548, other computer-readable media 550, and network connections 552.

Processor 544 may include one or more central processing units, circuitry, or other computing components or units—collectively referred to as a processor or one or more processors—that are configured to performed embodiments herein or to execute computer instructions to perform embodiments described herein. In some embodiments, a single processor may operate individually to perform embodiments described herein. In other embodiments, a plurality of processors may operate to collectively perform embodiments described herein, such that one or more processors may operate to perform some, but not all, of the embodiments described herein.

Memory 530 may include one or more various types of non-volatile and/or volatile storage technologies. Examples of memory 530 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 530 may be utilized to store information, including computer-readable instructions that are utilized by processor 544 to perform actions, including embodiments described herein.

Memory 530 may have stored thereon node manage system 204 and a plurality of nodes 206. The node management system 204 may include a node load management module 222, an add node module 224, a remove node module 226, a node scheduler module 230, a high load threshold database 210, and a low load threshold database 212. The add node module 224 is configured to add nodes to node 206 in response to the node load management module 222 determining that one or more nodes need to be added, as described herein. The remove node module 226 is configured to monitor nodes that have been identified or labeled for removal and to remove those nodes that have no current load, as described herein. The node scheduler module 230 is configured to schedule and assign a new load as directed b the node load management module 222, as described herein.

The node load management module 222 is configured to scale up or scale down the number of nodes 206 using high load thresholds and low load threshold, as described herein. In various embodiments, the node load management module 222 determines high load thresholds and low load thresholds for each node 206, and stores those thresholds in the high load threshold database 210 and the low load threshold database 212, respectively. When the node load management module 222 determines that all exiting nodes 206 meet their corresponding high load threshold, the node load management module 222 instructs the add node module 224 to add a new node. But when the node load management module 222 determines that at least one node 206 fails to meet its corresponding low load threshold, then the load management module 22 instructs the remove node module 224 to remove that node.

Although FIG. 5 illustrates the node load management module 222, the add node module 224, the remove node module 226, and the node scheduler module 230 as separate modules, embodiments are not so limited. Rather, one module or a plurality of modules may be employed to perform the functionality of the node load management module 222, the add node module 224, the remove node module 226, and the node scheduler module 230.

Network connections 552 are configured to communicate with other computing devices, such as mobile devices 124*a*-124*c*. Although FIG. 5 illustrates the wireless network communication management computing system 102 as communicating directly with mobile device 124*a*-124*c*, embodiments are not so limited. Rather the wireless network communication management computing system 102 may interact or communicate with the mobile devices 124*a*-124*c* via other computing systems, environments, or components of the wireless network. I/O interfaces 548 may include one or more data input or output interfaces, video or display interfaces, or other input/output interfaces. Other computer-readable media 550 may include other types of stationary or removable computer-readable media, such as removable flash drives, external hard drives, or the like.

The mobile devices 124*a*-124*c* may include processors, memory, I/O interfaces, network connections, or other computing components, but are not shown in FIG. 5 for case of discussion.

The following is a summarization of the claims as filed.

A method may be summarized as comprising: receiving a new load associated with a wireless network for a node to execute at least one network function of the wireless network; determining a number of existing nodes for the wireless network; determining a load existence time for the existing nodes; determining an arrival load rate for the existing nodes; defining a high load threshold for the existing nodes based on the number of existing nodes, the load existence time, and the arrival load rate; defining a low load threshold for the existing nodes based on the number of existing nodes, the load existence time, and the arrival load rate; adding a new node to the existing nodes in response to determining that a current load on each existing node at least meets the high load threshold; setting at least one existing node for removal in response to determining that the current load on the at least one existing node is below the low load threshold; and scheduling the new load to be assigned to an existing node.

The method may add the new node by selecting a maximum number of nodes for the wireless network and adding the new node to the existing nodes in response to determining that the current load on each existing node at least meets the high load threshold and that the number of existing nodes is less than the maximum number of nodes.

The method may set the at least one existing node for removal by selecting a minimum number of nodes for the wireless network and setting the at least one existing node for removal in response to determining that the current load on the at least one existing node is below the low load threshold and that the minimum number of nodes is maintained after the at least one existing node is removed.

The method may further comprise removing the at least one existing node that is set for removal when the at least one existing node is empty and has no current load.

The method may define the high load threshold for the existing nodes by defining, for each corresponding node of the existing nodes, a separate corresponding high load threshold for the corresponding node based on the number of existing nodes, the load existence time for the corresponding node, and the arrival load rate.

The method may define the high load threshold for the existing nodes by defining a single high load threshold for the existing nodes based on the number of existing nodes, an average load existence time across the existing nodes, and the arrival load rate.

The method may define the low load threshold for the existing nodes by defining, for each corresponding node of the existing nodes, a separate corresponding low load threshold for the corresponding node based on the number of existing nodes, the load existence time for the corresponding node, and the arrival load rate.

The method may define the low load threshold for the existing nodes by defining a single low load threshold for the existing nodes based on the number of existing nodes, an average load existence time across the existing nodes, and the arrival load rate.

The method may define the high load threshold for the existing nodes and define the low load threshold for the existing nodes in response to receiving the new load.

The method may define the high load threshold for the existing nodes and defining the low load threshold for the existing nodes prior to receiving the new load.

A system may be summarized as comprising: a plurality of nodes configured to execute network functions of the wireless network; and a node management system configured to: receive a new load associated with the wireless network for a node of the plurality of nodes to execute at least one network function of the wireless network; dynamically define a high load threshold for each of the plurality of nodes; dynamically define a low load threshold for each of the plurality of nodes; add a new node to the plurality of nodes in response to determining that a current load on each of the plurality of nodes at least meets the high load threshold; set at least one node from the plurality of nodes for removal in response to determining that the current load on the at least one node is below the low load threshold; and schedule the new load to be assigned to a node of the plurality of nodes having a least average load.

The node management system may add the new node by being further configured to: select a maximum number of nodes for the wireless network; determining a current number of nodes of the plurality of nodes; and add the new node to the plurality of nodes in response to determining that the current load on each node at least meets the high load threshold and that the current number of nodes is less than the maximum number of nodes.

The node management system may set the at least one existing node for removal by being further configured to: select a minimum number of nodes for the wireless network; set the at least one node for removal in response to determining that the current load on the at least one node is below the low load threshold and that the minimum number of nodes is maintained by the plurality of nodes after the at least one node is removed; and remove the at least one node set for removal in response to the at least one node being empty.

The node management system may dynamically define the high load threshold by being further configured to: dynamically define the high load threshold for each of the plurality of nodes based on a current number of nodes in the plurality of nodes, a load existence time for the plurality of nodes, and an arrival load rate for the plurality of nodes.

The node management system may dynamically define the low load threshold by being further configured to: dynamically define the low load threshold for each of the plurality of nodes based on a current number of nodes in the plurality of nodes, a load existence time for the plurality of nodes, and an arrival load rate for the plurality of nodes.

The node management system may dynamically define the high load threshold by being further configured to: define, for each corresponding node of the plurality of nodes, a separate corresponding high load threshold for the corresponding node based on a current number of nodes, a load existence time for the corresponding node, and an arrival load rate.

The node management system may dynamically define the high load threshold by being further configured to: define a single high load threshold for the plurality of nodes based on a current number of nodes, an average load existence time across the plurality of nodes, and an arrival load rate.

The node management system may dynamically define the low load threshold by being further configured to: define, for each corresponding node of the plurality of nodes, a separate corresponding low load threshold for the corresponding node based on a current number of nodes, a load existence time for the corresponding node, and an arrival load rate.

The node management system dynamically defines the low load threshold by being further configured to: define a single low load threshold for the plurality of nodes based on a current number of nodes, an average load existence time across the plurality of nodes, and an arrival load rate.

A non-transitory computer-readable storage medium may be summarized as storing instructions that, when executed by a processor in a computing system, cause the processor to perform actions, the actions comprising: receiving a new load associated with a wireless network for a node to execute at least one network function of the wireless network; determining a number of existing nodes for the wireless network; determining a load existence time for each corresponding node of the existing nodes; determining an arrival load rate for the existing nodes; for each corresponding node of the existing nodes: defining a corresponding first high load threshold for the corresponding node based on the number of existing nodes, the load existence time of the corresponding node, and the arrival load rate; defining a corresponding second low load threshold for the corresponding node based on the number of existing nodes, the load existence time of the corresponding node, and the arrival load rate; and defining a corresponding third load threshold for the corresponding node based on the corresponding first high load threshold and a current corresponding load on the corresponding node. The actions also comprising: creating a new standby node in response to determining that a current load on an existing node at least meets the corresponding third load threshold; adding the new standby node to the existing nodes to be assigned a load in response to determining that the current load on each existing node at least meets the corresponding first high load threshold; setting at least one existing node for removal in response to determining that the current load on the at least one existing node is below the corresponding second low load threshold for the at least one existing node; and scheduling the new load to be assigned to an existing node having a least average load.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
- receiving a new load associated with a wireless network for a node to execute at least one network function of the wireless network;
- determining a number of a plurality of existing nodes for the wireless network;
- determining a load existence time for each existing node of the plurality of existing nodes, the load existence time for an existing node indicates an amount of time a specific load exists on the existing node;
- determining an arrival load rate for the wireless network, the arrival load rate indicates a rate at which additional load is received by the wireless network for processing by a node;

defining a high load threshold for the plurality of existing nodes based on the number of the plurality of existing nodes, the load existence time, and the arrival load rate;

defining a low load threshold for the plurality of existing nodes based on the number of the plurality of existing nodes, the load existence time, and the arrival load rate;

adding a new node to the plurality of existing nodes in response to determining that a current load on each separate existing node at least separately meets the high load threshold, including:

selecting a maximum number of nodes for the wireless network; and adding the new node to the plurality of existing nodes in response to determining that the current load on each of the plurality of existing nodes at least meets the high load threshold and that the number of the plurality of existing nodes is less than the maximum number of nodes;

setting at least one existing node of the plurality of existing nodes for removal from the plurality of existing nodes in response to determining that the current load on the at least one existing node is below the low load threshold; and scheduling the new load to be assigned to an existing node of the plurality of existing nodes.

2. The method of claim 1, wherein setting the at least one existing node for removal further comprises:

selecting a minimum number of nodes for the wireless network; and setting the at least one existing node for removal from the plurality of existing nodes in response to determining that the current load on the at least one existing node is below the low load threshold and that the minimum number of nodes is maintained after the at least one existing node is removed from the plurality of existing nodes.

3. The method of claim 1, further comprising:

removing the at least one existing node that is set for removal when the at least one existing node is empty and has no current load.

4. The method of claim 1, wherein defining the high load threshold for the plurality of existing nodes further comprises:

for each corresponding node of the plurality of existing nodes:

defining a separate corresponding high load threshold for the corresponding node based on the number of the plurality of existing nodes, the load existence time for the corresponding node, and the arrival load rate.

5. The method of claim 1, wherein defining the high load threshold for the plurality of existing nodes further comprises:

defining a single high load threshold for the plurality of existing nodes based on the number of the plurality of existing nodes, an average load existence time across the plurality of existing nodes, and the arrival load rate.

6. The method of claim 1, wherein defining the low load threshold for the plurality of existing nodes further comprises:

for each corresponding node of the plurality of existing nodes:

defining a separate corresponding low load threshold for the corresponding node based on the number of the plurality of existing nodes, the load existence time for the corresponding node, and the arrival load rate.

7. The method of claim 1, wherein defining the low load threshold for the plurality of existing nodes further comprises:

defining a single low load threshold for the plurality of existing nodes based on the number of the plurality of existing nodes, an average load existence time across the plurality of existing nodes, and the arrival load rate.

8. The method of claim 1, wherein defining the high load threshold for the plurality of existing nodes and defining the low load threshold for the plurality of existing nodes are in response to receiving the new load.

9. The method of claim 1, wherein defining the high load threshold for the plurality of existing nodes and defining the low load threshold for the plurality of existing nodes are prior to receiving the new load.

10. A system, comprising:

a plurality of existing nodes configured to execute network functions of a wireless network; and a node management system configured to:

receive a new load associated with the wireless network for a node to execute at least one network function of the wireless network;

determine a number of the plurality of existing nodes for the wireless network;

determine a load existence time for each existing node of the plurality of existing nodes, the load existence time for an existing node indicates an amount of time a specific load exists on the existing node;

determine an arrival load rate for the wireless network, the arrival load rate indicates a rate at which additional load is received by the wireless network for processing by a node;

define a high load threshold for the plurality of existing nodes based on the number of the plurality of existing nodes, the load existence time, and the arrival load rate;

define a low load threshold for the plurality of existing nodes based on the number of the plurality of existing nodes, the load existence time, and the arrival load rate;

add a new node to the plurality of existing nodes in response to determining that a current load on each separate existing node at least separately meets the high load threshold;

set at least one existing node of the plurality of existing nodes for removal from the plurality of existing nodes in response to determining that the current load on the at least one existing node is below the low load threshold, including:

select a minimum number of nodes for the wireless network; and set the at least one existing node for removal from the plurality of existing nodes in response to determining that the current load on the at least one existing node is below the low load threshold and that the minimum number of nodes is maintained after the at least one existing node is removed from the plurality of existing nodes; and schedule the new load to be assigned to an existing node of the plurality of existing nodes.

11. The system of claim 10, wherein the node management system adds the new node by being further configured to:

select a maximum number of nodes for the wireless network; and add the new node to the plurality of existing nodes in response to determining that the current load on each of the plurality of existing nodes at least meets the high load threshold and that the number of the plurality of existing nodes is less than the maximum number of nodes.

12. The system of claim 10, wherein the node management system is further configured to:

remove the at least one existing node that is set for removal when the at least one existing node is empty and has no current load.

13. The system of claim 10, wherein the node management system defines the high load threshold for the plurality of existing nodes by being further configured to:

for each corresponding node of the plurality of existing nodes:

define a separate corresponding high load threshold for the corresponding node based on the number of the plurality of existing nodes, the load existence time for the corresponding node, and the arrival load rate.

14. The system of claim 10, wherein the node management system defines the high load threshold for the plurality of existing nodes by being further configured to:

define a single high load threshold for the plurality of existing nodes based on the number of the plurality of existing nodes, an average load existence time across the plurality of existing nodes, and the arrival load rate.

15. The system of claim 10, wherein the node management system defines the low load threshold for the plurality of existing nodes by being further configured to:

for each corresponding node of the plurality of existing nodes:

define a separate corresponding low load threshold for the corresponding node based on the number of the plurality of existing nodes, the load existence time for the corresponding node, and the arrival load rate.

16. The system of claim 10, wherein the node management system defines the low load threshold for the plurality of existing nodes by being further configured to:

define a single low load threshold for the plurality of existing nodes based on the number of the plurality of existing nodes, an average load existence time across the plurality of existing nodes, and the arrival load rate.

17. The system of claim 10, wherein the node management system defines the high load threshold for the plurality of existing nodes and defines the low load threshold for the plurality of existing nodes in response to receiving the new load.

18. The system of claim 10, wherein the node management system defines the high load threshold for the plurality of existing nodes and defines the low load threshold for the plurality of existing nodes prior to receiving the new load.

19. A non-transitory computer-readable storage medium that stores instructions that, when executed by a processor in a computing system, cause the processor to perform actions, the actions comprising:

receiving a new load associated with a wireless network for a node to execute at least one network function of the wireless network;

determining a number of a plurality of existing nodes for the wireless network;

determining a load existence time for each existing node of the plurality of existing nodes, the load existence time for an existing node indicates an amount of time a specific load exists on the existing node;

determining an arrival load rate for the wireless network, the arrival load rate indicates a rate at which additional load is received by the wireless network for processing by a node;

defining a high load threshold for the plurality of existing nodes based on the number of the plurality of existing nodes, the load existence time, and the arrival load rate;

defining a low load threshold for the plurality of existing nodes based on the number of the plurality of existing nodes, the load existence time, and the arrival load rate;

adding a new node to the plurality of existing nodes in response to determining that a current load on each separate existing node at least separately meets the high load threshold, including:

selecting a maximum number of nodes for the wireless network; and adding the new node to the plurality of existing nodes in response to determining that the current load on each of the plurality of existing nodes at least meets the high load threshold and that the number of the plurality of existing nodes is less than the maximum number of nodes;

setting at least one existing node of the plurality of existing nodes for removal from the plurality of existing nodes in response to determining that the current load on the at least one existing node is below the low load threshold, including:

selecting a minimum number of nodes for the wireless network; and setting the at least one existing node for removal from the plurality of existing nodes in response to determining that the current load on the at least one existing node is below the low load threshold and that the minimum number of nodes is maintained after the at least one existing node is removed from the plurality of existing nodes; and scheduling the new load to be assigned to an existing node of the plurality of existing nodes.

* * * * *